(12) United States Patent
Capps

(10) Patent No.: US 6,711,682 B1
(45) Date of Patent: Mar. 23, 2004

(54) ONLINE SERVICE REGISTRATION SYSTEM AND METHOD

(75) Inventor: Stephen P. Capps, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/501,803

(22) Filed: Feb. 9, 2000

(51) Int. Cl.[7] ............................. H04K 1/00; G06F 17/60
(52) U.S. Cl. ...................... 713/184; 713/202; 705/51
(58) Field of Search ................. 705/50–51; 707/9–10; 709/223–225, 227–229; 713/182–186, 200–202, 166, 168, 180, 156–159

(56) References Cited

U.S. PATENT DOCUMENTS

| | | | | |
|---|---|---|---|---|
| 5,732,212 A | * | 3/1998 | Perholtz et al. | 395/200.11 |
| 5,790,785 A | * | 8/1998 | Klug et al. | 395/188.01 |
| 5,922,045 A | * | 7/1999 | Hanson | 709/206 |
| 5,996,111 A | * | 11/1999 | Yoshida et al. | 714/784 |
| 6,029,141 A | * | 2/2000 | Bezos et al. | 705/27 |
| 6,128,663 A | * | 10/2000 | Thomas | 709/228 |
| 6,134,661 A | * | 10/2000 | Topp | 713/200 |
| 6,141,010 A | * | 10/2000 | Hoyle | 345/356 |
| 6,141,778 A | * | 10/2000 | Kane et al. | 714/201 |
| 6,275,824 B1 | * | 8/2001 | O'Flaherty et al. | 707/9 |

FOREIGN PATENT DOCUMENTS

EP   0 855 659 A1   *   7/1998   ............ G06F/17/30

OTHER PUBLICATIONS

Terry, Hardware and Software Keep Your PC Data Safe, Sep. 1, 1989, EDN, v34, n18, p61 (6).*

* cited by examiner

Primary Examiner—James P. Trammell
Assistant Examiner—Mary Wang
(74) Attorney, Agent, or Firm—Lee & Hayes, PLLC

(57) ABSTRACT

A method for registering a user for an online service includes receiving an initial access to an online service by a prospective user and determining whether the user has provided a valid user identifier (ID). If the prospective user fails to provide a valid user ID, automatically generating a memorable user identifier (ID), without acquiring any personal information regarding the prospective user, to enable the prospective user to anonymously access the online service.

59 Claims, 5 Drawing Sheets

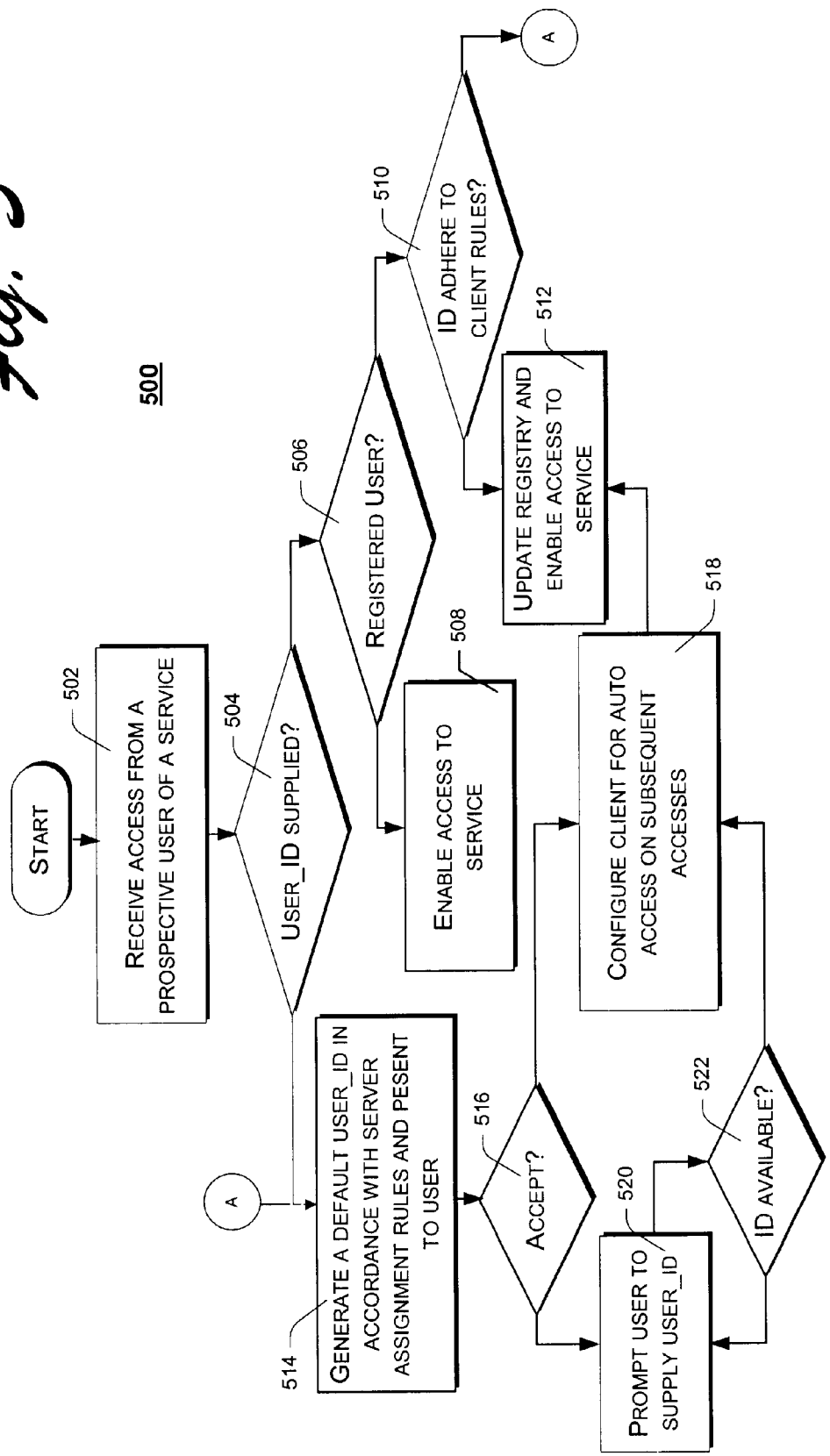

ONLINE SERVICE REGISTRATION SYSTEM AND METHOD

TECHNICAL FIELD

This invention relates generally to computer systems and their use of online services and, in particular, to an anonymous online service registration system and method.

BACKGROUND

With the rapid advance of computer technology expanding the practical application of personal computers, coupled with a near-quarterly reduction in computer system prices, the personal computer has become a popular household information appliance. Indeed, a very popular reason for the purchase of a personal computer today is the desire to utilize the wealth of online services such as, for example, the Internet, electronic mail (email), electronic commerce (including bill payment services) (eCommerce) and the like that have evolved over the last couple of years. Many of these consumers, however, have little or no experience with computers, or utilizing such online services from a home environment.

In order to access and utilize an online service, a registration process must typically be completed. The registration process for an online service will typically utilize a registration "wizard" to lead the user through a series of windows or screens and prompts to elicit the required "registration information" or "registration data" from the prospective user. As used herein, registration information refers to demographic and other information regarding the user and the user's computer. This might include information such as the user's intended use of the computer or software, the user's preferred activities, hobbies, computer configuration, other computer hardware or software components or peripherals that are being used in conjunction with the computer or software, the user's street address, telephone number, residence information (e.g., zip code), etc. The user must typically complete this registration process for each and every online service that the user wants to utilize. If the user fails to provide a piece of required registration information, the registration process fails and the prospective user is unable to utilize one or more of the online services offered by the provider.

As a result of the popularity of online services, and the recognition that such popularity can translate into advertising revenue and electronic commerce (eCommerce) for the online service provider, a significant amount of resources has been expended to improve the user interface(s) of such services in general, and the registration process in particular. Despite these efforts, registering for many popular online services still requires the user to traverse a number of windows of the registration wizard to complete the registration process. While many find this to be a rudimentary task, it remains daunting to others who find computers or the idea of the Internet to be somewhat overwhelming. Still others are reluctant to provide the personal information requested during the typical registration process. As a result, there remains a significant population of consumers that have yet to take advantage of online services, the cost of which is lost revenue to the service providers from both advertising and eCommerce income streams.

Accordingly, an anonymous online service registration system and method is required that is unencumbered by the inherent limitations typically associated with the prior art. Just such a solution is provided below.

SUMMARY

An automated anonymous online service registration system and method is presented, facilitating immediate, anonymous access to one or more online services without having to provide the wealth of personal information required in the typical registration process. According to one implementation, a method for registering a user for an online service includes receiving an initial access to an online service by a prospective user and determining whether the user has provided a valid user identifier (ID). If the prospective user fails to provide a valid user ID, a memorable user identifier (ID) is automatically generated without acquiring any personal information regarding the prospective user to enable the prospective user to anonymously access the online service.

The user ID for the prospective user is created in accordance with a syntax designed to make the ID memorable. However, it is not necessary that the user remember the user ID to gain subsequent access to the online service. In one implementation, for example, a configuration file including at least the memorable user identifier is downloaded to and installed on the client computer used to access the online service. Upon subsequent accesses to the online service, the server identifies the configuration file and, in particular, the user ID to grant access to the server, thereby relieving the user of having to memorize the user ID.

This technique for accessing online services is advantageous because it automatically and anonymously registers a user to utilize online services without otherwise obtaining user information. This, in turn, opens the door to online services to a heretofore ignored consumer. As the user becomes more adept at using the computer and/or online services, the user can then update registration profiles, etc., with a self-created password and additional user information.

BRIEF DESCRIPTION OF THE DRAWINGS

The present invention is illustrated by way of example and not limitation in the figures of the accompanying drawings. For ease of explanation, and not limitation, the same numbers are used throughout the figures to reference like components and/or features.

FIG. 5 illustrates a flow chart of an example method for providing anonymous access to online services, according to one embodiment of the invention.

DETAILED DESCRIPTION

Example Data Network

Figure 1:
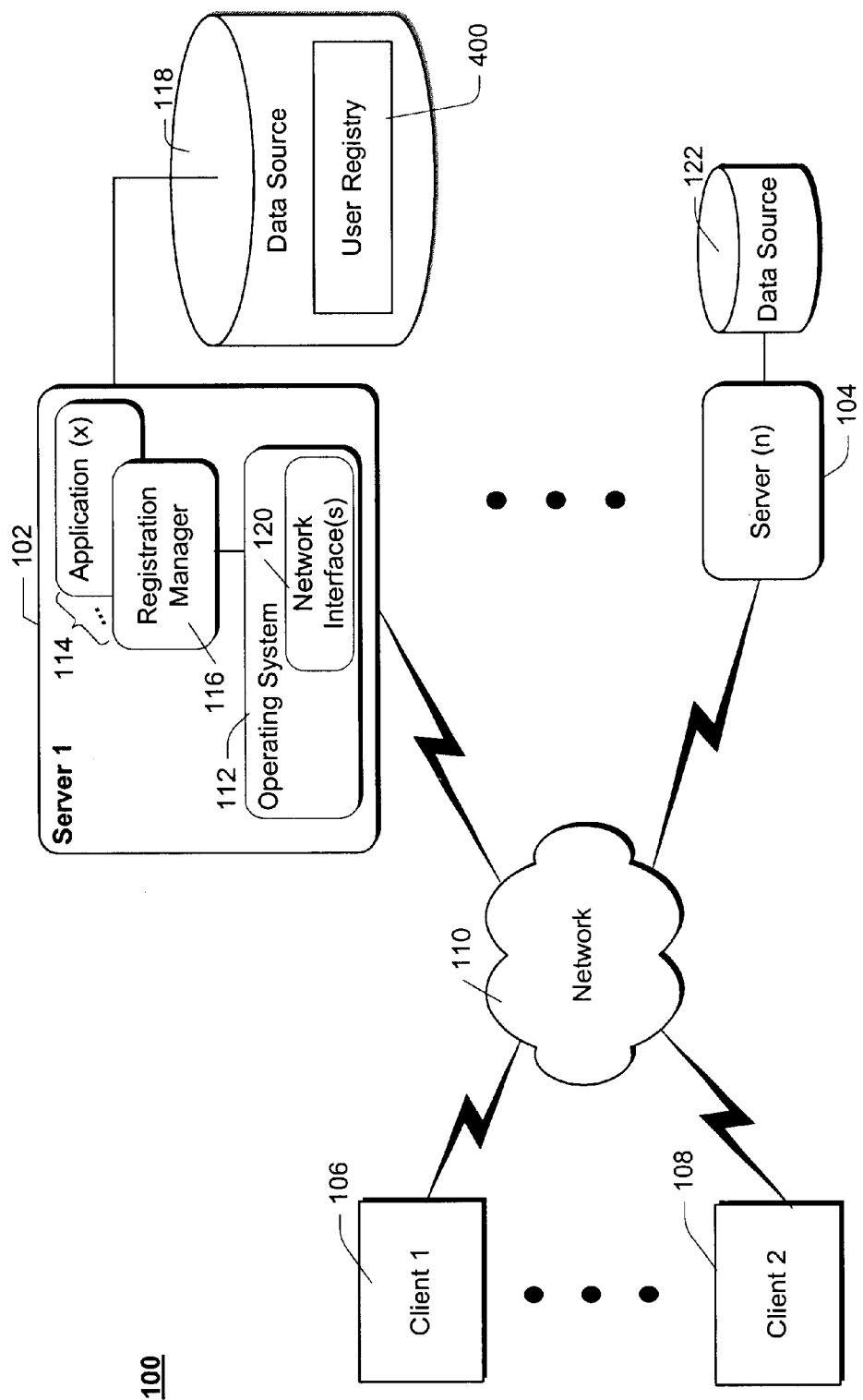
FIG. 1 illustrates a block diagram of an example client-server data network.

FIG. 1 shows an example client-server data network 100 having a plurality (n) of servers 102 and 104 coupled to one or more clients 106 and 108, respectively, via a data communications network 110. Network 110 may be implemented in a number of ways, including the Internet, a public switched telephone network (PSTN), a local area network (LAN), and a private wide area network (WAN). Communication among and between clients 106 and 108 and servers 102 and 104 can be accomplished in accordance with any of a variety of conventional communication protocols, such as the Hypertext Transfer Protocol (HTTP) or the Ethernet protocol, for example. Server 102 runs an operating system 112 that supports a plurality (x) of applications 114, including registration manager 116 incorporating the teachings of the present invention. The operating system 112 represents a wide variety of conventional operating systems including, for example, the "Windows NT" operating system from Microsoft Corporation and a UNIX-based operating system.

The server 102 has an associated data source 118 having stored therein a user registry 400 of all registered users of server 102. The operating system 112 has associated network interface(s) 120 to interface the server 102 with the network 110. The network interface 120 establishes, at the request of a remote computing system (i.e., a server or a client), a communication link with the remote computing system via network 110. Examples of just such a communication link include a "dial-up connection" using a conventional modem and telephone line, a network connection established through a network proxy, etc. Once a communication link is established, network interface 120 manages the communication link according to any of a wide variety of conventional communications protocols, allowing different applications 114 running on server 102 to communicate with client computers 106 and 108 and/or server 104.

The remaining server 104 may have a similar construction and configuration as server 102, with an associated data source 122 and network interfaces (not shown) to interface the with network 110.

Client computers 106 and 108 each individually represent a broad range of client computing platforms and information appliances including a personal computer system, a thin-client computer system, a personal digital assistant (PDA), a handheld computer system, a set-top box appliance such as WebTV, and the like. Client computers 106 and 108 run an operating system and/or a browser to communicate with server 102 to facilitate use of online resources.

Registration manager 116, as will be developed more fully below with reference to FIGS. 3 and 5, automatically registers a prospective user of an online service to anonymously use the online service, without prompting the user for personal information. Accordingly, during an initial access by a prospective user Using a source client computer, e.g., client 106, an instance of registration manager 116 is invoked. Registration manager 116 generates an unique and memorable user identifier which is placed in the user registry 400, enabling access to one or more online service applications 114 offered by server 102 to one proffering the memorable user identifier. In certain implementations, to be discussed more fully below, registration manager 116 on the initial access downloads a configuration file (e.g., a cookie) to the accessing client computer 106 with at least the memorable user identifier, enabling the user to directly access the one or more online service applications 114 without being prompted for the memorable user identifier. In this way, registration manager 116 effectively enables a user to anonymously utilize one or more online service applications 114 without being prompted for any personal information.

It should be noted that although automated registration manager 116 is depicted in the example network of FIG. 1 as a separate functional element of server 102, this is for ease of explanation only, as registration manager 116 may well be implemented on server 104, and may well be integrated with one or more of applications 114 or within operating system 112 without deviating from the spirit or scope of the present invention. The automated registration manager is described below in more detail with respect to FIG. 3.

Example Computer System

In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices.

Figure 2:
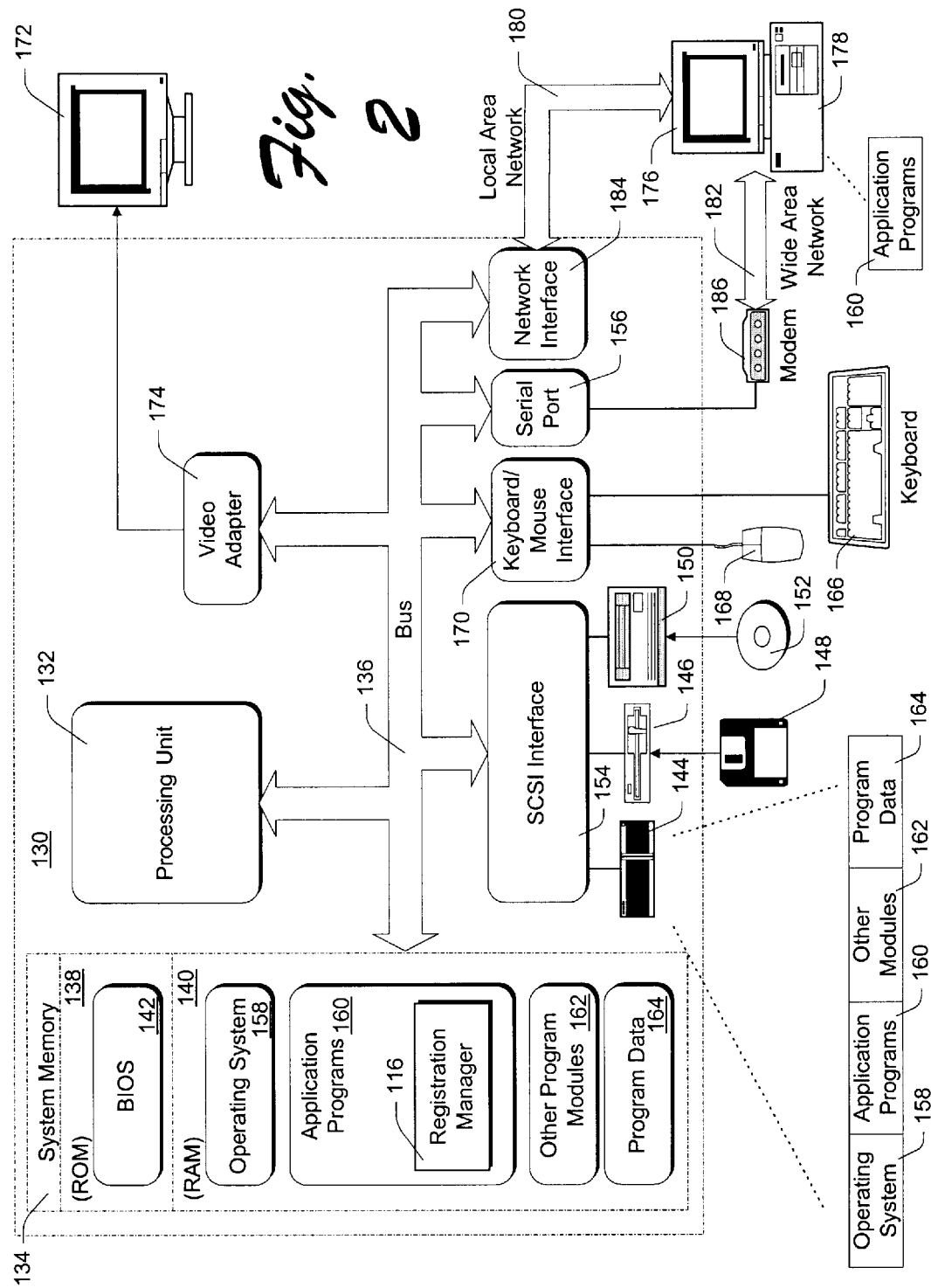
FIG. 2 illustrates a block diagram of a computer system that may be used to implement a server or a client in the client-server data network of FIG. 1.

FIG. 2 shows a general example of a computer 130 suitable for use as a server (e.g., server 102) or a client (e.g., client 106) in accordance with the invention. Computer 130 is shown as an example of a computing platform that can perform the functions of a client computer 106 or a server 102 or 104 of FIG. 1.

As shown, computer 130 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 130, such as during start-up, is stored in ROM 138. Computer 130 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface (e.g., universal serial bus (USB), Firewire, etc.). The drives and their associated computer-readable media provide nonvolatile storage of computer readable instructions, data structures, program modules and other data for computer 130. Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative registration manager 116, other program modules 162, and program data 164. A user may enter commands and information into computer 130 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 130 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 130, although only a memory storage device 178 has been illustrated in FIG. 2.

As shown, the logical connections depicted in FIG. 2 include a local area network (LAN) 180 and a wide area network (WAN) 182. Such networking environments are commonplace in offices, enterprise-wide computer networks, intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Registration Manager

Figure 3:
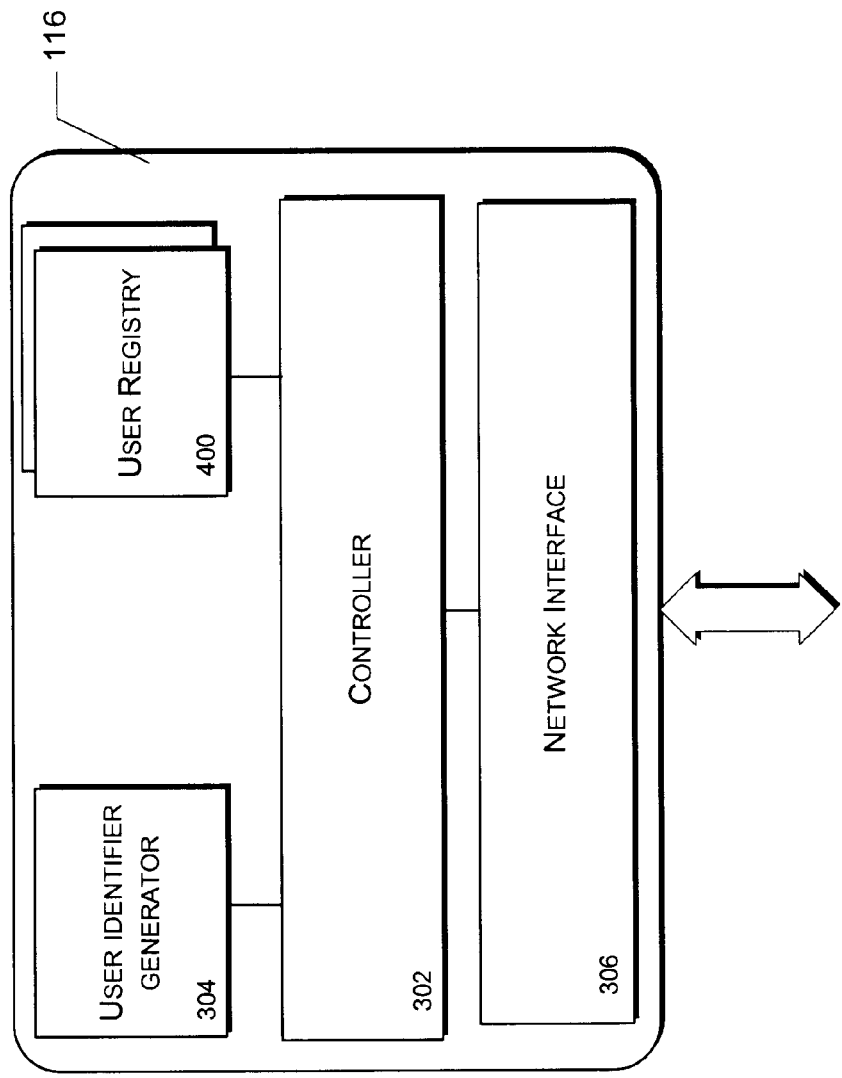
FIG. 3 illustrates a block diagram of an example registration manager to anonymously register users to access and use an online service, according to one embodiment of the invention.

FIG. 3 illustrates a block diagram of an example registration manager 116 to automatically register a prospective user to anonymously access and utilize one or more online service applications 114 of server 102, without being prompted for any personal information. As shown, registration manager 116 includes controller 302, user identifier (ID) generator 304, user registry 400 and a network interface 306, each coupled as depicted. For ease of explanation, each of controller 302, user ID generator 304, network interface 306 and user registry 400 are illustrated in FIG. 3 as independent functional blocks. It is to be appreciated, however, that one or more of these functional blocks may well be combined and integrated without deviating from the spirit and scope of the present invention. Indeed, such alternate implementations are anticipated. In addition, registration manager 116 and the functional blocks illustrated within FIG. 3 may well be implemented as functional elements of an executable program within software or firmware.

Controller 302 communicates with other applications, e.g., online service applications 114 operating on server 102, server 104 or clients 106 and 108, respectively, to invoke and manage the user ID generator 304 and user registry 400 services of registration manager 116. In one implementation, for example, a user interface application executing on server 102 presents registration manager 116 as an executable service to users of server 102, e.g., client 106.

Upon initiating the anonymous registration process, controller 302 determines whether a valid user ID has been supplied by accessing user registry 400. As will be described in greater detail below, a valid user ID is one that adheres to either server assignment rules or client assignment rules. If the user ID supplied by the accessing client, e.g., client 106, is located within the registry 400 or otherwise adheres to client assignment rules, controller 302 enables the accessing user to anonymously utilize one or more online services 114 offered by server 102.

When the accessing client 106 fails to provide a valid user ID, controller 302 invokes an instance of user ID generator 304 to create a memorable user identifier. Controller 302 provides the user of accessing client 106 with the newly generated memorable user ID via a user interface, e.g., graphical user interface (GUI). In addition, controller 302 creates a configuration file containing the newly generated user identifier, or an alias thereof (e.g., general user ID (GUID)), and downloads the configuration file to the accessing client 106 via network interface 306. Use of the GUID, usually a rather large number which uniquely identifies the user, enables controller 302 to identify the user by the original anonymous user ID, as well as any personal ID generated by the user at some point in the future. For example, if Jim Smith originally accesses the system using the "Green Moose" identifier, but then updates the user profile with a new user ID, e.g., "ColoradoJim", the service will still identify each as the same user. In this way, email (for example) sent to Green Moose or ColoradoJim will all be delivered to Jim Smith (with a single GUID). The configuration file automatically provides controller 302 with the assigned user ID upon subsequent accesses of the service by accessing client 106.

Once the user ID is generated, controller 302 populates user registry 400 with the newly generated user identifier, enabling subsequent access using the newly generated user ID. In addition, controller 302 also manages the period for which user identifiers are valid. Assume, for instance, registration manager 116 is employed in conjunction with a limited trial offer to utilize one of online service applications 114, anonymously, to enable the prospective user to exercise the service to see if they would like to subscribe (anonymously, or otherwise). In such an instance, controller 302 would not only populate user registry 400 with the newly generated memorable user identifier, but also a date upon which the user identifier ceases to be valid. In alternate embodiments, controller 302 limits the features, rather than time, to those utilizing the anonymous access to online services. In one implementation, for example, controller 302 provides an anonymous user with ten (10) free stock quotes, but on the request for the eleventh, controller 302 asks the user for a little more user information. The purpose of the foregoing example is to illustrate that as registration manager 116 is flexible to accommodate any number of applications, so, too, is controller 302 to manage the information required to be maintained within user registry 400 to meet the needs of such applications.

As introduced above, user ID generator 304 is invoked by controller 302 upon an initial access of the registration manager 116 by a prospective user. In response to invocation by controller 302, user ID generator 304 constructs a memorable user identifier for the prospective user, without prompting the user for or otherwise gathering any personal information regarding the prospective user, in accordance with a set of server assignment rules. The server assignment rules may vary from system to system, but are designed to ensure that a number of unique user identifiers can be generated, without duplicates, to handle a number of prospective users of the system. In one implementation, for example, user ID generator 304 generates user identifiers in accordance with the syntax:

$$\text{color\_animal\_optional integer (0-9)} \qquad (1)$$

An example of a memorable user identifier generated in accordance with the above server assignment syntax would be "Green_Moose", or "Red_Partridge_3". A default server assignment syntax may be pre-programmed within user ID generator 304 at the time of manufacture, and may well be modified by the administrator of server 102 to reflect the business or service which registration manager 116 is to support. In other implementations, controller 302 may detect a geographic region from which the prospective user is accessing the system, i.e., by trapping the automatic number identifier (ANI) information (telephone number) received from network 110 during a direct dial-up connection, and generating a memorable user ID reflecting the detected geographic region. In one embodiment, for example, user ID generator 304 combines one or more of a local sport team, town landmarks, county name, etc., determined form the trapped ANI, to generate a memorable user ID.

In addition, controller 302 also recognizes user ID's adhering to client assignment rules as a valid user identifier. Assume, for instance, that for marketing purposes anonymous access to one or more online service applications 114 of server 102 is provided along with some other products, e.g., software, computers, peripherals, etc., as promotional material. To automatically enable such access, the product is configured to provide a user ID adhering to client assignment rules facilitating anonymous access to the one or more online services. Instead of pre-populating user registry 400 with a number of user ID's that may never be utilized, controller 302 recognizes the presentation of a user ID adhering to the client assignment rules as a valid user ID, and populates user registry 400 with at least the user ID upon the initial access of the service, facilitating anonymous access to the one or more online service applications 114. In one implementation, for example, a user ID generated in accordance with the client assignment rules also includes a color and an animal, but in reverse order than the server assignment rules. That is, a user ID adhering to the client assignment rules conforms to the syntax:

$$\text{animal\_color\_optional marketing code} \qquad (2)$$

An example of a user ID adhering to the client assignment rules includes "Moose_Green", or "Alligator_Purple_Microsoft", the latter including an optional marketing code denoting that the one or more online service applications 114 was referenced by a Microsoft product or service. The use of such marketing codes are utilized to denote the product or service with which the anonymous access to the one or more online service applications 114 was presented, to afford proper accounting and credit to those products or services which provide referrals to the service. It is anticipated that controller 302 may well maintain a separate listing of the number of instances a marketing code is referenced within user ID's of user registry 400 as a means of calculating remuneration for marketing effectiveness.

Network interface 306 is utilized by controller 302 to access network resources such as, for example, server 104, clients 106 and 108, and data sources 118 and 122. Accordingly, inclusion of network interface 306 may, in select implementations, alleviate the need for registration manager 116 to rely on the network interface 120 of operating system 112 to communicate with network elements. That is, network interface 306 facilitates the use of registration manager 116 as a stand-alone element of data network 110.

Example Data Structure

As used herein, data sources 118 and 122 are each intended to represent any of a number of storage devices/media for storing data structures. For example, data sources 118 and 122 may well be comprised of one or more of a floppy disk is within a floppy disk drive, a hard disk drive, a redundant array of independent drives (RAID) system, a compact disk (CD) inserted within an accessible CD player, a digital versatile disk (DVD) inserted within an accessible DVD player, a magnetic tape within a tape drive, and the like. Such storage devices/media are well known to those skilled in the art and, thus, need not be described further.

As introduced above, user registry 400 is stored and accessible from a suitable data source, e.g., data source 118 and/or 122, by registration manager 116. One example of a data structure suitable for use as user registry 400 facilitating anonymous access to one or more online service applications 114 is presented with reference to FIG. 4.

Figure 4:
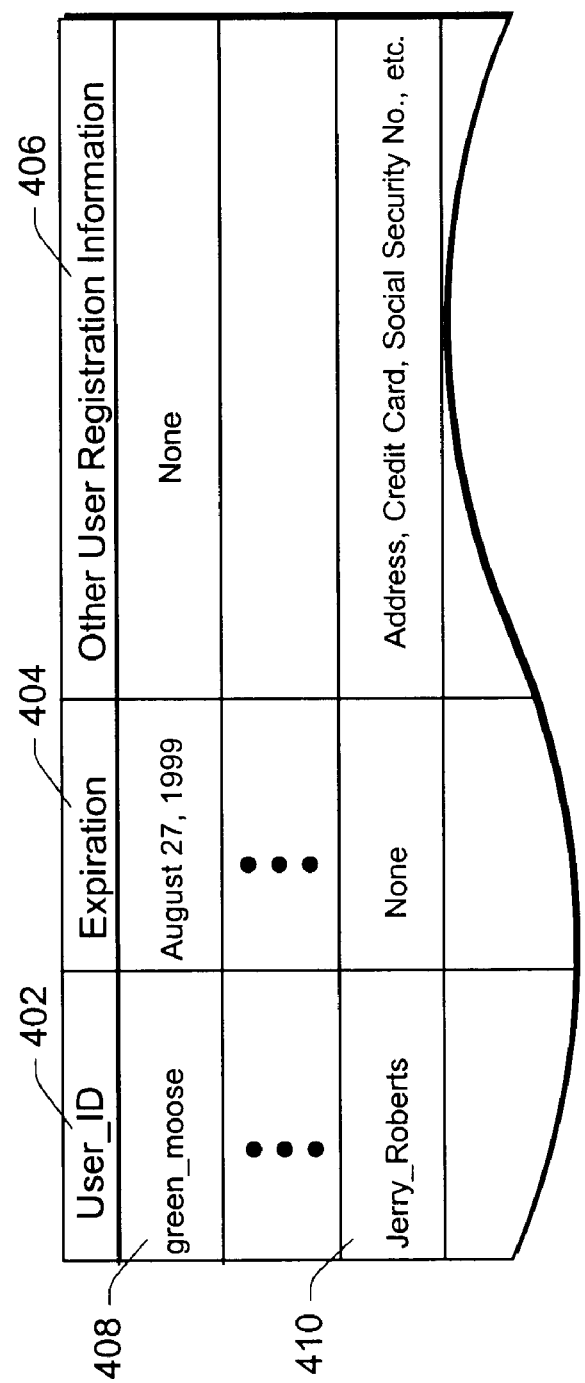
FIG. 4 graphically illustrates a data structure populated with user information facilitating access to an online service.

FIG. 4 graphically illustrates an example data structure suitable for use as user registry 400 populated with information regarding a plurality of users of server 102. User registry 400 is used by server 102 to maintain a list of active user identifiers authorized to anonymously use one or more online service applications 114 provided by server 102. As shown, user registry 400 includes a number of fields including a user_ID field 402, an expiration field 404 and fields for other user registration information, if provided, cumulatively referenced as field 406. User ID field 402 is populated with authorized user ID's by controller 302, as described above. If the period of authorization to utilize the one or more online service applications for a particular user ID is time limited, it will be so denoted in the expiration date field 404.

As provided above, registration manager 116 automatically provides anonymous use of one or more online service applications 114, without having to populate the other information fields 406. In certain implementations, however, one or more aspects of one or more online applications 114, or one or more applications 114 in total are not available for anonymous invocation. In such an instance, one or more of the other information fields 406 must be populated in order to access the aspect or service. One example might include certain ecommerce applications 114. It should be appreciated that user registry 400 is but one example of a data structure suitable for use by registration manager 116, and that alternate data structures such as, for example, a database, a spreadsheet and the like may well be used without deviating from the spirit and scope of the present invention.

Example Operation

Having introduced the operating environment and functional elements of the innovative registration manager 116 with reference to FIGS. 1–4, above, the operation of registration manager 116 will now be developed more fully with reference to FIG. 5. For ease of explanation, and not limitation, the operation of the innovative registration manager 116 will be developed in accordance with an example implementation wherein a user attempts to anonymously utilize one or more online service applications 114 of server 102 from client computer 106. Accordingly, the operation of registration manager 116 will be developed with continued reference to FIGS. 1–4.

FIG. 5 illustrates a flow chart of an example method of providing anonymous access to one or more online service applications, according to one embodiment of the present invention. As shown, the method begins in step 502 when server 102 receives an access from a prospective user of an online service application 114. As described above, the access may be completed in any of a number of ways including a direct dial connection, e.g., using a toll free "800" number advertised or provided by another product or service, or by a virtual communication link via the Internet. In either case, controller 302 receives the access and determines whether the accessing computer 106 has a valid user ID, step 504. As described above, controller 302 accesses user registry 400 to determine whether a user ID provided by the accessing client computer 106 is a valid user ID.

If the accessing client computer 106 does not automatically provide a user ID, controller 302 interrogates client computer 106 for a previously downloaded configuration file endowed with a valid user ID adhering to the server assignment rules. In other instances, a product or service utilized by client computer 106 is endowed with a user ID adhering to the client assignment rules. If controller 302 identifies a user ID in step 504, controller 302 determines whether the offered user ID is a valid user ID denoting a registered user, step 506. If the user ID provided is located by controller 302 within user registry 400, the user is provided access to the one or more online service applications 114, step 508.

Even if, in step 506, an offered user ID is not identified by controller 302 in user registry 400, controller 302 may well determine that the offered user ID is valid if it adheres to the client assignment rules described above, step 510. If the offered user ID does conform to the client assignment rules, controller 302 updates user registry 400 to include the offered user ID in user_ID field 402 and, optionally, sets an expiration date in expiration field 404 denoting the date upon which the user ID ceases to be valid, step 512.

Returning to step 504, if the accessing client computer 106 does not have nor offer a user ID, controller 302 invokes an instance of user ID generator 304 to generate a memorable user identifier in accordance with the server assignment rules as described above, step 514. Controller 302 presents the memorable user ID generated by user ID generator 304 to the user at client computer 106, prompting the user as to whether the ID is acceptable, step 516. If the generated ID is acceptable, controller 302 configures the accessing client 106 for automatic access on subsequent accesses to server 102, step 518, before updating the user registry, as described above, step 512. According to one implementation, controller 302 constructs a configuration file (e.g., a cookie) (not shown) including at least the generated user ID, and downloads the configuration file to the accessing client 106. On subsequent accesses of server 102, controller 302 identifies the configuration file and, in particular, the user ID within the configuration file and facilitates access to the one or more online services, as described above. If, in step 516, the user does not accept the user ID created by user ID generator 304, controller 302 prompts the user with the option of creating their own memorable user ID, step 520, which is sent back to controller 302 (e.g., by pressing the return key when finished). In step 522, controller 302 accesses the user identifier field 402 of user registry 400 to determine whether the user created user ID is available. If so, the process continues by preparing and downloading a configuration file (step 518) and updating the user registry 400 to reflect the new user ID (step 512).

Conclusion

As provided above, the innovative registration manager of the present invention automatically registers and provides true anonymous access to online services, relieving users of having to provide personal information.

Although the invention has been described in language specific to structural features and/or methodological steps, it is to be understood that the invention defined in the appended claims is not necessarily limited to the specific features or steps described. In one embodiment, for example, although the invention provides for anonymous access, that access may well be monitored by the invention and user traits recorded. For example, as an anonymous user accesses certain features, services, sites, etc., the invention continually updates information stored in the registry to better serve the anonymous user. Accordingly, while the specific features and steps are disclosed as preferred forms of implementing the claimed invention, those skilled in the art will appreciate that the present invention can be practiced with modification and alteration within the spirit and scope of the appended claims.

What is claimed is:

1. A method for registering a prospective user to utilize an online service, the method comprising:

receiving an initial access to an online service by a prospective user;

determining whether the user has provided a valid user identifier (ID); and if the user has not provided a valid user ID:
automatically generating a memorable user identifier (ID), without acquiring personal information regarding the prospective user;
displaying a user interface (UI) including the memorable user ID;
retrieving any change to the memorable user ID via the UI; and
enabling the prospective user to access the online service using either the original or the changed memorable user IDs.

2. A method as recited in claim 1, further comprising adding the memorable user ID to a user registry associated with the online service enabling access to the online service.

3. A method as recited in claim 1, wherein the determining comprises accessing a user registry associated with the online service to search for a user ID offered by the prospective user.

4. A method as recited in claim 1, wherein the determining comprises identifying that a user ID offered by the user adheres to client assignment rules.

5. A method as recited in claim 4, wherein a user ID generated in accordance with client assignment rules substantially differs from a user ID generated in accordance with server assignment rules.

6. A method as recited in claim 5, wherein a user ID generated in accordance with client assignment rules are distributed to prospective users with a product or service unrelated to the online service as promotional material.

7. A method as recited in claim 1, wherein the memorable user ID is generated in accordance with server assignment rules.

8. A method as recited in claim 1, further comprising:
constructing a configuration file including at least the memorable user ID to facilitate direct access to the online service on subsequent accesses; and
downloading the configuration file to a client computer used by the prospective user to access the online service.

9. A method as recited in claim 8, wherein the configuration file is used during subsequent accesses to the online service to automatically provide the user ID, facilitating direct access to the online service.

10. A storage medium having stored therein a plurality of executable instructions which, when executed, implement a method as recited in claim 1.

11. The method as defined in claim 1, wherein the automatically generating the memorable user ID further comprises enabling the prospective user to make both the initial and successive accesses to the online service without the online service acquiring personal information about the prospective user.

12. The method as defined in claim 1, wherein the automatically generating the memorable user ID further comprises generating the memorable user ID without requiring the prospective user to input personal information about the prospective user.

13. The method as defined in claim 1, wherein the automatically generating the memorable user ID further comprises generating the memorable user ID without prompting the prospective user to input demographic information about the prospective user.

14. The method as defined in claim 1, wherein the automatically generating the memorable user ID further comprises generating the memorable user ID so as to conform to a predetermined syntax.

15. The method as defined in claim 1, wherein the personal information includes demographic information regarding the prospective user.

16. The method as defined in claim 1, further comprising detecting a geographic region from any automatic number identifier (ANI) information from a telephone number of a dial-up connection connecting the initial access to the online service, wherein the automatically generating the memorable user ID further comprises forming the memorable user ID to include an association with the detected geographic region.

17. The method as defined in claim 1, wherein:
the receiving an initial access to an online service by a prospective user further comprises receiving a product identifier from the prospective user;
the automatically generating the memorable user ID further comprises forming the memorable user ID to include the product identifier; and
the product identifier is selected from the group consisting of a good, a service, and a provider of goods and/or services.

18. The method as defined in claim 1, wherein the automatically generating the memorable user ID further comprises forming the memorable user ID to include:
a word from one or more word lists; and
an optional number, whereby the memorable user ID is unique.

19. A business method comprising:
offering an online service to prospective users from an accessible server;
automatically generating a memorable user identifier (ID), without acquiring personal information regarding a prospective user, for the prospective user requesting access to the service if the prospective user has not offered a valid user identifier (ID); displaying a user interface (UI) including the memorable user ID;
retrieving a change to the memorable user ID via the UI; and
enabling the prospective user to access the online service using either the original or the changed memorable user IDs.

20. A business method as recited in claim 19, further comprising:
verifying that the prospective user has offered a valid user ID by,
accessing a user registry associated with the online service to identify the offered user ID; and
determining whether the offered user ID adheres to client assignment rules if the offered user ID is not identified within the user registry.

21. A business method as recited in claim 20, wherein a user ID generated in accordance with client assignment rules is provided to the prospective user in association with a product or service that is unrelated to the online service.

22. A business method as recited in claim 20, further comprising:
populating the u user registry with the user ID adhering to the client assignment rules to facilitate direct access to the online service on subsequent accesses by the user.

23. A business method as recited in claim 22, further comprising:
constructing a configuration file including at least the user ID; and
downloading the configuration file to a client computer used to access the online service to automatically provide the user ID to the online service on subsequent accesses to the service by the user.

24. A business method as recited in claim 19, further comprising:
dynamically generating a user ID for the prospective user if the user has failed to provide a valid user ID.

25. A business method as recited in claim 24, wherein the dynamically generated user ID is generated in accordance with server assignment rules, without acquiring personal information regarding the prospective user.

26. A business method as recited in claim 24, further comprising:
populating a user registry with the dynamically generated user ID facilitating direct access to the online service on subsequent accesses by the user.

27. A business method as recited in claim 24, further comprising:
constructing a configuration file including at least the dynamically generated user ID; and
downloading the configuration file to a client computer used to access the online service to automatically provide the user ID to the online service on subsequent accesses to the service by the user.

28. A storage medium having stored therein a plurality of executable instructions which, when executed, implement a business method as recited in claim 19.

29. The business method as defined in claim 19, wherein the automatically generating the memorable user ID further comprises generating the memorable user ID without requiring the prospective user to input personal information regarding the prospective user.

30. The business method as defined in claim 19, wherein the automatically generating the memorable user ID further comprises generating the memorable user ID without prompting the prospective user to input demographic information regarding the prospective user.

31. The business method as defined in claim 19, wherein the automatically generating the memorable user ID further comprises generating the memorable user ID so as to conform to a predetermined syntax.

32. The method as defined in claim 19, wherein the personal information includes demographic information characterizing the prospective user.

33. The business method as defined in claim 19, further comprising detecting a geographic region from any automatic number identifier (ANI) information from a telephone number of a dial-up connection connecting the requesting access to the online service, wherein the automatically generating the memorable user ID further comprises forming the memorable user ID to include an association with the geographic region.

34. The business method as defined in claim 19, further comprising receiving an initial access to the online service from the prospective user supplying a product identifier, wherein:
the automatically generating the memorable user ID further comprises forming the memorable user ID to include the product identifier; and
the product identifier is selected from the group consisting of a good, a service, and a provider of goods and/or services.

35. The business method as defined in claim 19, wherein the automatically generating the memorable user ID further comprises forming the memorable user ID to include:
a word from one or more word lists; and
an optional number, whereby the memorable user ID is unique.

36. A registration manager comprising:
a user identifier (ID) generator to create, upon an invocation, a memorable user ID for a prospective user of the online service without acquiring personal information about the prospective user;
controller, coupled to the user ID generator, to receive an initial access from a prospective user and, if the user fails to provide a valid user ID, to invoke the user ID generator, to facilitate access of the online service;
means for displaying a user interface (UI) including the memorable user ID;
means for retrieving a change to the memorable user ID via the UI; and
means for enabling the prospective user to access the online service using either the original or the changed memorable user IDs.

37. A registration manager as recited in claim 36, further comprising:
a user registry, coupled to the controller, containing a list of valid user ID's.

38. A registration manager as recited in claim 37, wherein the controller accesses the user registry to identify the user ID offered by the prospective user to determine if the offered user ID is a valid user ID.

39. A registration manager as recited in claim 37, wherein the controller identifies whether the user ID offered by the prospective user adheres to client assignment rules to determine if the offered user ID is valid.

40. A registration manager as recited in claim 39, wherein the controller updates the user registry with the offered user ID adhering to client assignment rules to facilitate direct anonymous access on subsequent accesses to the online service.

41. A registration manager as recited in claim 39, wherein the controller constructs and downloads a configuration file including at least the user ID to a client computer used by the prospective user to access the online service to automatically provide the controller with the valid user ID upon subsequent accesses to the online service.

42. A registration manager as recited in claim 36, wherein the controller populates a user registry with the dynamically generated user ID to facilitate direct, anonymous access to the online service upon subsequent accesses by the prospective user.

43. A registration manager as recited in claim 36, wherein the controller constructs and downloads a configuration file including at least the valid user ID to a client computer utilized by the prospective user to access the online service to automatically provide the valid user ID on subsequent accesses to the online service.

44. A storage medium having stored therein a plurality of executable instructions which, when executed, implements a registration manager as recited in claim 36.

45. A server for a Web site comprising the registration manager as recited in claim 36.

46. The registration manager as defined in claim 36, wherein the user ID generator creates the memorable user ID without requiring the prospective user of the online service to input personal information about the prospective user.

47. The registration manager as defined in claim 36, wherein the user ID generator creates the memorable user ID without prompting the prospective user to input demographic information about the prospective user.

48. The registration manager as defined in claim 36, wherein the user ID generator creates the memorable user ID so as to conform to a predetermined syntax.

49. The registration manager as defined in claim 36, wherein the personal information includes demographic information characterizing the prospective user.

50. A registration manager as recited in claim 36, wherein the user ID generator further comprising means for detecting a geographic region from any automatic number identifier (ANI) information from a telephone number of a dial-up connection connecting the requesting access to the online service, wherein the memorable user ID includes an association with the geographic region.

51. A registration manager as recited in claim 36, further comprising means for receiving an initial access to the online service from the prospective user supplying a product identifier, wherein:
 the user ID generator further comprises means for forming the memorable user ID to include the product identifier; and
 the product identifier is selected from the group consisting of a good, a service, and a provider of goods and/or services.

52. A registration manager as recited in claim 36, wherein the user ID generator further comprising means for forming the memorable user ID to include:
 a word from one or more word lists; and
 an optional number, whereby the memorable user ID is unique.

53. A system comprising:
 a client executing a client program to provide a user identifier (ID) for making an initial access to an online service at a server through a network; and
 a server program executing on the server to:
  receive the initial access to the online service from the client;
  determine whether the user ID provided by the client is a valid user ID; and
  when the user ID is determined by the server program to be invalid:
   automatically generate a user ID;
   display a user interface (UI) including the user ID;
   retrieve any change to the user ID via the UI; and
   enable the client to make subsequent accesses to the online service using either the original or the changed user IDs without acquiring personal information about the client.

54. The system as defined in claim 53, wherein the automatically generating the user ID further comprises generating the memorable user ID without requiring the prospective user to input personal information about the client.

55. The system as defined in claim 53, wherein the automatically generating the user ID further comprises generating the memorable user ID without prompting the prospective user to input the personal information.

56. The system as defined in claim 53, wherein the automatically generating the user ID further comprises generating the memorable user ID so as to conform to a predetermined syntax.

57. The system as defined in claim 53, wherein the server program executing on the server further detects a geographic region from any automatic number identifier (ANI) information from a telephone number of a dial-up connection connecting the initial access to the online service, wherein the automatically generating the memorable user ID further comprises forming the memorable user ID to include an association with the detected geographic region.

58. The system as defined in claim 53, wherein: the receiving of the initial access to the online service from the client further comprises receiving a product identifier from the client;
 the automatically generating the memorable user ID further comprises forming the memorable user ID to include the product identifier; and
 the product identifier is selected from the group consisting of a good, a service, and a provider of goods and/or services.

59. The system as defined in claim 53, wherein the server program executing on the server further forms the memorable user ID to include:
 a word from one or more word lists; and
 an optional number, whereby the memorable user ID is unique.

* * * * *

UNITED STATES PATENT AND TRADEMARK OFFICE
CERTIFICATE OF CORRECTION

PATENT NO.    : 6,711,682 B1
DATED         : March 23, 2004
INVENTOR(S)   : Capps It is certified that error appears in the above-identified patent and that said Letters Patent is hereby corrected as shown below:

<u>Column 8,</u>
Line 50, delete "is" between "disk" and "within".

<u>Column 10,</u>
Line 29, insert new paragraph between "above." and "If,".

Signed and Sealed this

Sixth Day of July, 2004

JON W. DUDAS
*Acting Director of the United States Patent and Trademark Office*